Feb. 9, 1960 A. C. MULDER 2,924,750
SATURABLE CORE CONTROL MEANS
Filed Jan. 23, 1958 2 Sheets-Sheet 1

INVENTOR.
ALLAN C. MULDER
BY
Andrus + Starke
Attorneys

*INVENTOR.*
ALLAN C. MULDER
BY

Attorneys

United States Patent Office 2,924,750
Patented Feb. 9, 1960

2,924,750

SATURABLE CORE CONTROL MEANS

Allan C. Mulder, Appleton, Wis., assignor to Miller Electric Manufacturing Company, Appleton, Wis., a corporation of Wisconsin Application January 23, 1958, Serial No. 710,755

14 Claims. (Cl. 315—205)

This invention relates to arc welding apparatus employing saturable control core means to adjust the welding output current and particularly to a method for controlling the initial current rise of the welding current.

Various saturable control core means for adjusting the welding current output have been suggested in the prior art. Generally, a core is inductively linked with the welding circuit and a direct current saturating means is associated with the core to control the D.C. saturation thereof. The reactance inserted in the circuit by the control core means is inversely proportional to the level of the direct current saturation of the core. Therefore, the welding output current which is proportional to the reactance of the circuit is directly proportional to the direct current saturation of the core.

Saturable core controls provide a simple and inexpensive means of current control particularly where remote control is desired. This is true because a very small D.C. current is used, requiring light connecting control leads which can be readily connected to the welding source and transported to the place of welding to affect the remote control.

However, saturable core means in the welding circuit retard the normal rate at which the current rises to its full amplitude. That is, a relatively long time lag occurs between the initial contact of the electrode and the work to establish the arc and the time at which the welding current reaches its full amplitude. This is particularly true in self-saturating control core means where essentially separate core means are provided and each subjected to either one or the other of the half-cycles of current. The self-saturation of each core establishes an unusually slow current rise.

It has been suggested that to overcome the effect of the core means on the initial current rise, an initial surge of saturating current be employed during the initial striking of the arc. The core means is then substantially saturated and establish a relatively low reactance to the welding current. Consequently, the welding current rapidly rises to its full amplitude.

The present invention is directed to a control means to automatically increase the saturation of the cores during the striking of the arc and also to separate adjustable means included in the control means to allow varying the slope of the starting current from a slow to a fast current start. The control means automatically reverts back to a normal welding control connection to maintain a normal predetermined welding current.

In accordance with the present invention, a potentiometer or other similar impedance device is adapted to be interposed between the source of saturating current and the D.C. saturating control core winding and includes an adjustable connection to adjust the level of the welding current. During the normal welding cycle, the potentiometer is parallel connected in the circuit between the D.C. current source and the saturating winding. However, during the initial striking of the arc, the potentiometer connection which is removed from or opposite the adjustable connection is opened. The potentiometer winding is then a series resistance element with the portion of the potentiometer between the D.C. current source and the potentiometer tap being connected in series with the saturating winding across the source of saturating current. This connection results in an increased flow of saturating current with a resultant increase in the saturation of the core means. The reactance or opposition to current flow is thereby reduced and allows a rapid build-up of the welding current.

In accordance with another aspect of the invention, an adjustable resistance device is connected in series between the potentiometer and the saturating winding. The resistance device is connected in the circuit during the initial striking of the arc and the value of the resistance inserted determines the rate at which the welding current rises to its final value. During normal welding operation the variable resistance device is disconnected from the circuit by an electrical switch or the like which is preferably responsive to the arc welding voltage.

In still another aspect of the invention, an interlock control is provided between the connecting circuit of the power supply to the electrode and the work and a starting current control which is responsive to the welding output voltage such that complete shut down of the apparatus corresponds to idling condition, that is, disconnecting of the power supply corresponds to breaking of the arc as regards the operation of the starting current control.

This application is a continuation in part of applicant's copending application entitled Arc Welding Machine, Serial No. 655,641, which was filed on April 29, 1957, now U.S. Patent 2,880,374, and which is assigned to a common assignee with the present invention.

An object of the present invention is to provide a simple and reliable means for controlling the slope of the current rise in a welding machine having saturable control means therein.

The drawings furnished herewith illustrate the best mode presently contemplated by the inventor for carrying out his invention.

Figure 1:
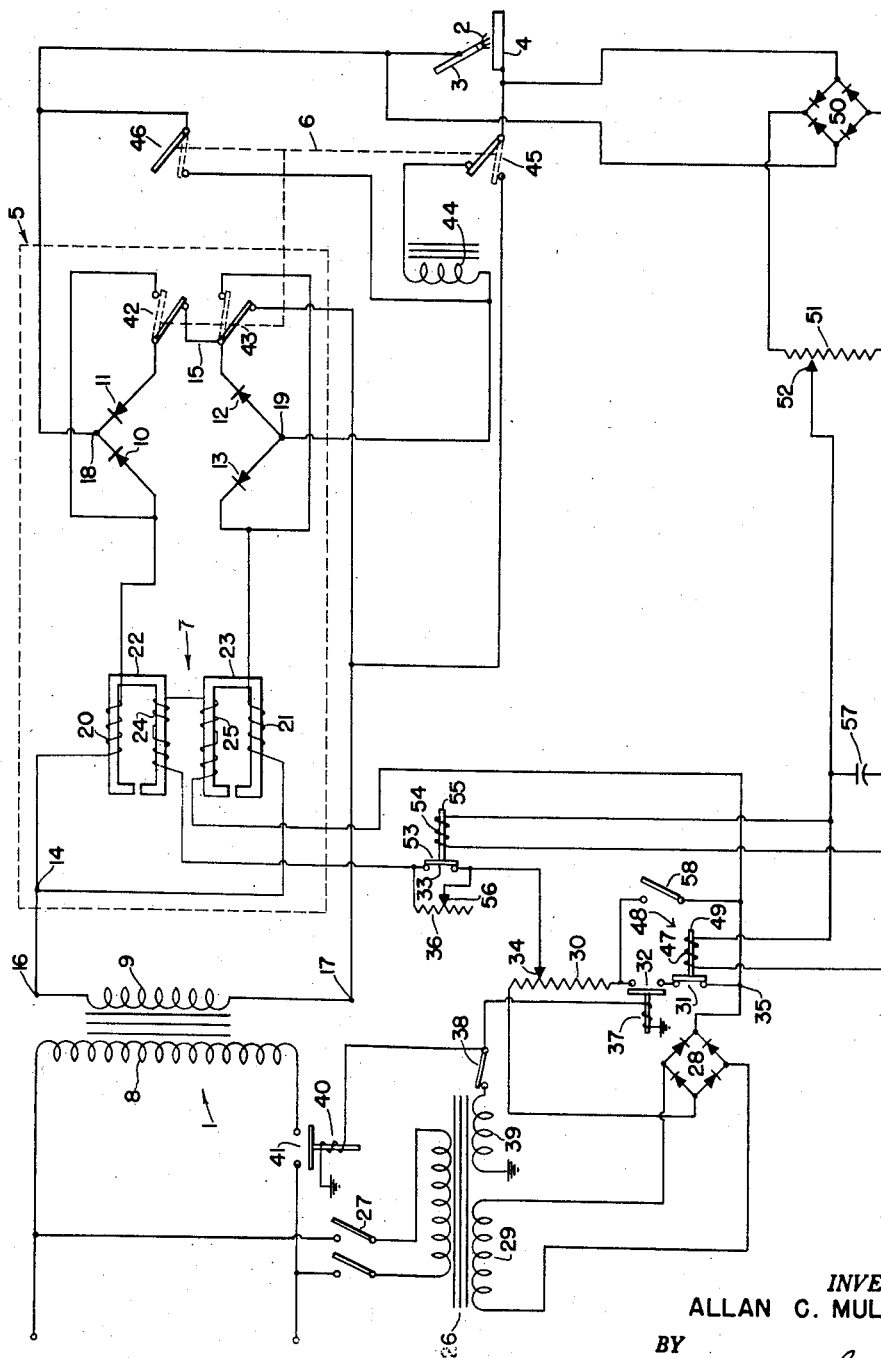
Figure 1 is a schematic circuit diagram of an arc welding circuit employing the present invention.

Referring to Figure 1 of the drawings, welding apparatus is shown including a transformer 1 adapted to supply current to establish and maintain an arc 2 between an electrode 3 and a workpiece 4. A rectifier circuit 5 is selectively connected in the welding output circuit by a switch assembly 6 to selectively supply an A.C. (alternating current) or a D.C. (direct current) welding current to the arc 2. A saturable control core assembly 7 is connected in the rectifier circuit 5 to permit adjustment of the magnitude of the welding current.

The circuit of Figure 1 illustrates the present invention in detail as incorporated in a simplified illustration of the welding circuit shown in applicant's previously referred to copending application entitled Arc Welding Machine, Serial No. 655,641, now U.S. Patent 2,880,374, which was filed on April 29, 1957, and which is assigned to a common assignee with the present invention. The copending application may be referred to for a more detailed description for that portion of the welding circuit connections which is hereinafter described to the extent necessary to clearly explain and illustrate the present invention.

The illustrated transformer 1, is a single phase type having a primary winding 8 adapted to be connected to a set of A.C. input power lines, not shown, such as in the conventional distribution system supplying 60 cycle current. A secondary winding 9 is magnetically coupled to the primary winding. The primary winding 8 and the secondary winding 9 are so arranged as to establish a nearly constant potential output voltage across the secondary winding to strike and maintain the arc 2.

The switch assembly 6 in the illustrated full-line position of Fig. 1 connects the rectifier assembly 5 in circuit to establish a D.C. welding current supply to the arc 2 in the following manner. The rectifier assembly 5 includes four rectifiers 10, 11, 12 and 13 connected in a full wave bridge circuit with the switch assembly 6 in the full line position. A.C. input terminals 14 and 15 are established and connected to the opposite terminals 16 and 17 of the transformer secondary winding 9. D.C. output terminals 18 and 19 of the rectifier assembly 5 are established and are connected respectively to the electrode 3 and the workpiece 4.

The saturable control assembly 7 includes a pair of load current windings 20 and 21 connected one each in a corresponding alternately active branch of the rectifier bridge circuit. The winding 20 is shown connected in series with the rectifier 10 in the one bridge leg defining the A.C. input terminal 14. The winding 21 is shown connected in series with the rectifier 13 in the other bridge leg defining the A.C. input terminal 14. The winding 20 is wound upon a leg of rectangular core 22 and the winding 21 is wound upon a leg of a separate rectangular core 23 to form separate reactors. A direct current saturating winding 24 encircles the control core 22 and a direct current winding 25 encircles core 23. The D.C. windings 24 and 25 are serially connected together to a suitable source of direct current, as more fully described hereinafter, to saturate the cores 22 and 23 to thereby control the welding current.

Each of the D.C. windings 24 and 25 is shown as comprising a pair of coils. This construction reduces the potential difference within any one coil resulting from the changing flux which is established by the load current in the respective windings 20 and 21. This simplifies electrically insulating between the turns of the coils.

The saturable control assembly 7 in combination with a relatively constant potential transformer 1 establishes the conventional drooping voltage-current characteristic across the electrode 3 and work 4. In the absence of an arc 2, the open circuit voltage across the electrode 3 and work 4 in a conventional welding circuit is of the order of 70 or 80 volts whereas while the arc 2 is being established, the voltage across the electrode 3 and work 4 decreases in proportion to the increase in welding current flow and reaches a welding voltage level of the order of 30 or 40 volts.

A single coil encircling adjacent legs of cores 22 and 23, as shown in the referred to copending application, may also be used to control the saturation of cores 22 and 23.

The magnitude of the load current is controlled by the saturating direct current supplied to the D.C. saturating windings 24 and 25. The D.C. saturating current in the windings 24 and 25 establishes a D.C. flux in the corresponding core which changes the inductance of the load current windings 20 and 21 on the corresponding core and thereby varies the reactance to the D.C. pulsating current flowing through each of the windings 20 and 21.

The illustrated direct current source for windings 24 and 25 includes a step-down control transformer 26 connected by a double pole switch 27 across the incoming power leads of the primary winding 8 of the welding transformer 1.

A full-wave bridge rectifier 28 is connected across a secondary winding 29 of the transformer 26 to establish a source of D.C. saturating current which is adjustably connected to the windings 24 and 25 through a potentiometer winding 30.

The potentiometer winding 30 is connected across the output of the full-wave bridge rectifier 28 in series with a set of normally closed contacts 31 and a set of normally open start contacts 32. The D.C. saturating windings 24 and 25 are connected in series circuit with each other and with a pair of normally closed relay contacts 33 and the opposite ends of this series circuit are respectively connected to a movable tap 34 on the potentiometer winding 30 and to a common terminal 35 with the rectifier assembly 28 and the series contacts 31. An adjustable resistor 36 is connected across the relay contacts 33 and is normally short circuited thereby.

A starting relay 37 controls the normally open contacts 32. When the relay 37 is energized the contacts 32 close to complete the connection of the potentiometer winding 30 across the rectifier 28 in series with the normally closed contacts 31. The starting relay 37 is connected for selective energization in series with a manually operated start-stop switch 38 across another secondary winding 39 of control transformer 26.

A relay 40 is also connected to the secondary winding 39 in parallel with the relay 37 and includes a set of normally open contacts 41 in the power leads of the primary winding 8. When the relay 40 is energized, the contacts 41 close and supply power to the transformer 1 which establishes a potential difference across the electrode 3 and the work 4 suitable for striking the arc 2.

During a direct current welding operation, the current flow in the circuit is as follows. Assuming for purposes of illustration that current flows from terminal 16 during the positive half-cycle of input current and from terminal 17 during the negative half-cycle of input current.

During the positive half-cycle of the input current, the flow is from terminal 16 through the load current winding 20 and rectifier 10 to the output terminal 18 of rectifier assembly 5. From the output terminal 18, the current flows to the electrode 3 and then through the arc 2 to the work 4 to maintain the arc. The current then flows through the reactor 44 to rectifier output terminal 19 and through the rectifier 12 to the input terminal 15 which is directly connected to the secondary terminal 17 to complete the current flow.

Consequently, during the positive half-cycle of current, the current value is determined by the reactance of the load current winding 20. This reactance is determined by the D.C. saturation of the corresponding core 22.

During the negative half-cycle of the input current, the current flows from the terminal 17 to rectifier input terminal 15 and then through the rectifier 11 to output terminal 18 of the rectifier assembly 5. From terminal 18, the current flows through the arc 2 and back to output terminal 19 in the same direction as the positive half-cycle of current to maintain the arc by a current flowing in the same direction. The negative half-cycle current then flows from terminal 19 through the series connected rectifier 13 and load current winding 21 to the input terminal 14 and directly connected secondary terminal 16.

Consequently, during the negative half-cycle of output current, the current is determined by the reactance of the load current winding 21. This reactance is determined by the D.C. saturation of the corresponding core 23.

As the current rise control is the same with switch assembly 6 in the D.C. and A.C. welding output position, the A.C. circuit connection is described before proceeding with the description of the current rise control circuit.

To connect the circuit for A.C. welding, switch assembly 6 is thrown to the dotted line position. As more fully set forth in the previously referred to copending application, in that switch position, the rectifier 11 is disconnected from the input terminal 15 and connected in parallel with the rectifier 10 by a single-pole, double-throw switch 42 of switch assembly 6. The input terminal 15 is disconnected from the secondary winding terminal 17 and rectifier 12 is connected in parallel with rectifier 13 by a single-pole, double-throw switch 43 of switch assembly 6. The paralleled rectifiers 10 and 11 are similarly polarized to allow current flow therethrough in the direction toward the electrode 3 while the rectifiers 12 and 13 are similarly polarized to allow current flow therethrough in the direction from the electrode 3. Consequently, the load current windings 20 and 21 each carry a pulsating direct current represented by the corresponding positive and negative cycles of the alternating current flowing in the welding circuit and through arc 2.

The output terminal 19 of the rectifier assembly 5 is disconnected from the work 4 between the work and the smoothing reactor 44 and the work 4 is connected directly to the input terminal 17 of the secondary 9 by a single-pole, double-throw switch 45 of switch assembly 6. A switch 46 of switch assembly 6 simultaneously connects the output terminal 19 to the electrode 3.

The alternating current welding output current flows as follows; assuming that the welding current generally flows from secondary terminal 16 through the arc 2 to secondary terminal 17 during the positive half-cycle of the welding current and in the opposite direction during the negative half-cycle.

During the positive half-cycle of current flow, the current first flows through the load winding 20 and the parallel connected rectifiers 10 and 11. The current is presently blocked from flowing through the load winding 21 by the paralleled rectifiers 12 and 13. From the rectifiers 10 and 11, the current flows to the electrode 3 and then through the arc 2 to the work 4 to maintain the arc 2. From the work 4, the current flows directly back to the secondary terminal 17.

Consequently, during the positive half-cycle of output current, the current flow is determined by the reactance of the load winding 20. This reactance is determined by the D.C. saturation of the corresponding core 22.

During the negative half-cycle of output current, the current flows in the opposite direction, from the secondary terminal 17 to the work 4 and then through the arc 2 to the electrode 3 to maintain the arc 2. From the electrode 3, the current flows through the paralleled rectifiers 12 and 13 and then through the load current winding 21 and back to secondary terminal 16. The negative half-cycle of current is blocked from flowing through the load current winding 20 by rectifiers 10 and 11.

Consequently, during the negative half-cycle of output current, the current flow is determined by the reactance of the load current winding 21. This reactance is determined by the D.C. saturation of the corresponding core 23.

As in the D.C. circuit connection, the alternate rectifier branches carry one half the load current wave, that is, a pulsating D.C. current. The A.C. welding current output is adjusted by varying the current supplied to the D.C saturating windings 24 and 25, in the same manner as in the D.C. circuit connection.

In both the A.C. and D.C. welding circuit connections, pulsating D.C. current flows in the load windings 20 and 21; that is with the previously assumed current flow established by transformer 1, the positive half-cycle flows in winding 20 and the negative half-cycle in winding 21. Consequently, a uni-directional flux is established in the corresponding cores 22 and 23 and normally the flux is in the same direction as the flux established by the corresponding D.C. windings 24 and 25. The flux established by current in the respective windings therefor add and establish self-saturated cores. Although, improved arc welding characteristics result, the self-saturating feature of the cores 22 and 23 retards the current buildup during the initial striking of the arc. This is undesirable for certain welding applications.

The rate at which the current rises in either the A.C. or the D.C. arc welding circuit connection described is controlled in accordance with the present invention by automatically changing the excitation of the D.C. windings 24 and 25 during the initial striking of the arc, in the following manner.

A relay winding 47 of a relay 48 is magnetically associated with the potentiometer-connecting contacts 31 through an armature 49 and is connected in circuit to respond to the voltage existing between the electrode 3 and work 4. A full-wave bridge type rectifier 50 is connected to the electrode 3 and to the work 4 to establish a direct current source for energizing the relay 48. A potentiometer winding 51 is connected across the output of the rectifier 50 and is adjustably connected to the relay winding 47 by a movable tap or contact 52 on the potentiometer. The setting of the tap 52 determines the proportion of the potential existing between the electrode 3 and the work 4 which is applied to the relay winding 47.

The relay winding 47 electromagnetically positions its armature 49 to respectively close and open the contacts 31 incident to a normal welding voltage and an open circuit voltage.

A relay 53, generally similar to relay 48, includes a winding 54 connected in parallel with the relay winding 47 for simultaneous energization therewith in accordance with the voltage across the electrode 3 and the work 4. The winding 54 electromagnetically positions an armature 55 to respectively close and open the contacts 33 incident to a normal welding arc voltage and an open circuit voltage. Therefore, the contacts 33 are opened during the striking of the arc 2 to insert a portion of the resistor 36 in the circuit as determined by a movable tap or contact 56 which slidably engages the resistor 36. The contacts 33 are closed during normal welding to short the resistor 36 from the circuit.

A condenser 57 is connected in parallel with the relay windings 47 and 54 to insert a time delay action in the relays.

The direct current flow which is established from potentiometer 51 charges the condenser 57 to a corresponding proportional voltage. When the potentiometer voltage drops as a result of an arc voltage drop, the charged condenser 57 discharges through the relay windings 47 and 54 until the charge on the condenser 57 again equals the potential between the tap 52 and the common connection to the potentiometer 51. The discharging of the condenser 57 maintains the relay windings 47 and 54 energized and therefore the contacts 31 and the contacts 33 open until the discharge current is insufficient to maintain sufficient energization of the respective windings 47 and 54 to hold the relay armatures 49 and 55.

The relays 48 and 53 are of a variety which open the associated contacts 31 and 33 immediately upon energization thereof. The output of the main control rectifier 28 is then connected across the D.C. windings 24 and 25 in series with a portion of the potentiometer 30 and a portion of resistor 36 as determined by the setting of the respective movable taps or contacts 34 and 56. The voltage drop across the potentiometer 30 between the tap 34 and the rectifier 28 decreases because current is no longer drawn by the portion of the potentiometer between the tap 34 and the common terminal 35. The voltage applied to the saturating windings 24 and 25 is correspondingly increased and the saturation of the cores 22 and 23 rises due to the increased current flow established by the higher applied voltage. The percentage or the degree of increased current flow is further controlled by the setting of the resistor 36.

During the striking of the arc 2, the welding current rises to the full amplitude and the voltage across the electrode 3 and the workpiece 4 rapidly drops from a relatively high open circuit voltage to a substantially lower arc voltage. Thus, as previously set forth, open circuit voltage is normally of a magnitude of 70 or 80 volts and normal welding voltage is 30 or 40 volts.

As the voltage across the electrode 3 and work 4 decreases, the charging current to the condenser 57 decreases accordingly. The condenser then discharges through the relay windings 47 and 54 until the charge or voltage across the condenser equals the voltage then across the potentiometer 51 between tap 52 and the common side of the potentiometer 51. This voltage level is proportional to the voltage across the arc 2 and due to the drooping voltage amperage characteristic thereof the voltage level has dropped below the holding level of the relays 48 and 53 and the contacts 31 and 33 close.

The potentiometer winding 30 is then connected directly across the output of rectifier 28 and the D.C. windings 24 and 25 are connected to the rectifier 28 in parallel with a portion of the potentiometer winding 30. Simultaneously, the closing of the contacts 33 shorts the start-control-resistor 36 from the circuit.

A manually operable switch 58 is connected across the series-connected contacts 31 and 32 to selectively short circuit the contacts. If the welding application requires a slow start, the switch 58 is closed and maintains a bypass around the contacts 31 and 32. This maintains the normal parallel connection of potentiometer 30 and thereby prevents increased saturation during striking of the arc.

Figure 2:
Fig. 2 is an envelope of the welding current under conditions of a slow rise of the welding current.
Figure 3:
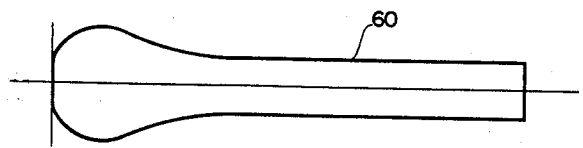
Fig. 3 is a view of an envelope of a very rapid start with the current rise initially rising above the level of the normal welding current.
Figure 4:
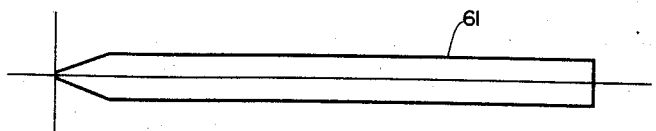
Fig. 4 is an envelope of an intermediate start or rise of the welding current.

Figs. 2–4 of the drawings illustrate the envelopes of the initial current rise of an alternating welding current resulting from different settings of the tap 56 of control resistor 36 and the connection of the normal current control potentiometer 30. The envelopes are shown substantially to the same scale to clearly illustrate the effect of the invention.

Referring to Fig. 2, a slow start envelope 59 is shown where a relatively great number of cycles of current flow occurs before the welding current reaches full amplitude.

In a maximum slow-start position, the variable resistor 36 is connected by tap 56 to insert its entire resistance in series with the windings 24 and 25 and the switch 58 is closed. Although relays 37 and 48 are energized, the effect thereof is removed from the circuit by the closing of switch 58 and the inherent slow current rise of a self-saturating reactance circuit results. The insertion of the resistor 36 further reduces the saturating current, thereby increasing the reactance and further retarding the current rise.

Fig. 3 illustrates the envelope 60 of a very rapid rate of current rise, that is, a very rapid start. The switch 58 is opened and the resistor 36 is adjusted to a zero resistance setting such that no resistance is inserted in the circuit when the contact 33 opens. Consequently, the saturating current increases substantially and the cores 22 and 23 are relatively highly saturated. The welding current then rises very rapidly and even overshoots the normally welding current level. When the time delay relays 48 and 53 are de-energized due to the decrease in voltage across the electrode 3 and work 4, the associated contacts 31 and 33 are released to decrease the saturation and the amplitude of the welding current recedes to the predetermined amplitude for maintaining the arc 2.

In Fig. 4, the current rises to full amplitude in a fraction of the time shown in Fig. 2 but more slowly than the current rise of Fig. 3 as shown by the envelope 61. To obtain such a rate of current rise, the resistor 36 is connected in the circuit and the switch 58 is opened. The relays 48 and 53 are momentarily actuated as described and increase the saturation of cores 22 and 23 which allows the current to rapidly rise to full amplitude.

The degree of increased saturation is also adjusted by the resistance inserted in the saturating circuit by the resistor 36. Therefore, by the combined controlled connection of the potentiometer 30 and the variable resistor 36, the current rise may be varied between a very slow start as shown in Fig. 2 and a very rapid start as shown in Fig. 3, as the individual welding application requires.

However, the overshoot of the current during the very rapid start as illustratively shown in Fig. 3 is inherently limited to a welding current setting which is below the maximum welding current. Thus, if the potentiometer 30 is set for maximum welding current, the same voltage is applied to the saturating windings 24 and 25 with the contacts 31 opened as with the contacts 31 closed and consequently the same saturating current flows. The problem of the rate of current rise only occurs, as a practical matter, at the lower welding current settings and therefore an increase in the rate of current rise is not necessary at a setting for maximum welding current.

On a maximum welding current setting, the rate of current rise can, however, be reduced by the insertion of resistance in the circuit, by suitable adjustment of the resistor 36, during establishment of the arc 2.

When switch 38 is open the normally open relay contacts 32 of relay 37 disconnect the parallel connection of potentiometer 30 and simulate the opening of the same circuit by relay 48 incident to the establishment of open circuit voltage across the electrode 3 and the work 4. If the electrode 3 and work 4 are now engaged prior to the closing of switch 38, the saturation of cores 22 and 23 is nevertheless increased and the welding current relatively rapidly rises in much the same manner as described above.

Although separate relays 37 and 48 are shown to establish corresponding direct current circuit conditions between idling and complete shutdown, a single differential relay opening the circuit in response to both open circuit voltage as at idling and zero voltage as at complete shutdown and closing the circuit in response to a predetermined intermediate voltage or voltage range may be employed.

Further, a multi-contact relay may be employed instead of the two separate relays 48 and 53.

The present invention is particularly useful in welding circuits having self-saturating control circuits. However, the same general advantages are obtained from the invention in a conventional saturable reactor or saturable transformer control and the like.

Further, although a control circuit is shown responsive to the voltage across an electrode and a work member, means responsive to the power or some other electrical characteristic established in the welding circuit can be employed; for example, corresponding current characteristics and suitable current responsive means may be employed to effect the desired switching.

The present invention provides simple, readily adjusted current control means for establishing an arc in an arc welding machine having saturable core current control means.

Various modes of carrying out the invention are contemplated as being within the scope of the following claims particularly pointing out and distinctly claiming the subject matter which is regarded as the invention.

I claim:

1. An arc welding circuit adapted to be connected to an alternating current source and having alternately active load current windings carrying the negative and positive portions of the input current and having direct current saturating winding means magnetically coupled with said load current windings, which comprises a source of direct current, a potentiometer parallel connected to said source of direct current and to said saturating winding, means to adjust the direct current supplied to said winding means from said source, and switch means responsive to the welding circuit power to operable disconnect one side of the potentiometer from the direct current source during initial establishment of the arc.

2. An arc welding circuit adapted to be connected to an A.C. source to establish a drooping arc voltage characteristic having a high open circuit voltage and a low welding voltage and having alternately active load current windings carrying the negative and positive portions of the input current and having direct current saturating winding means magnetically coupled with said load current windings, which comprises a source of direct current, a potentiometer means connected to said source of direct current and to said saturating winding and having movable tap means to adjust the direct current supplied to said winding means, electroresponsive switch means connected between the potentiometer and a common connection to said current source and said saturating winding means and having operating means connected to a voltage proportional to the arc voltage, said operating means biasing the switch means to open circuit position incident to the application of open circuit voltage and to closed circuit position incident to the application of the welding voltage, and time delay means energized by the open circuit voltage and adapted to maintain a substantially open circuit voltage to said switch means for a predetermined period after the open circuit voltage reduces to the welding voltage.

3. An arc welding circuit adapted to be connected to an A.C. source and having alternately active load current windings carrying the negative and positive portions of the input current and having direct current saturating winding means magnetically coupled with said load current windings, which comprises a source of direct current, a potentiometer means connected to said source of direct current and to said saturating winding and including a movable connection and a common connection, means to adjust the direct current supplied to said winding means, circuit switch means responsive to the welding power to momentarily open the common connection of the potentiometer during initial striking of a welding arc, and manually operable means adapted to disenable said switch means and to maintain said potentiometer connection during initial establishment of the arc.

4. An arc welding circuit adapted to be connected to an A.C. source and having alternately active load current windings carrying the negative and positive portions of the input current and having direct current saturating winding means magnetically coupled with said load current windings, which comprises a source of direct current, a potentiometer parallel connected to said source of direct current and to said saturating winding means by a common connection and by a movable tap to adjust the direct current supplied to said winding means, switch means connected in the potentiometer circuit between the potentiometer and the common connection to said current source and said saturating winding means and responsive to the welding circuit power to momentarily open said switch means during initial establishment of the arc, resistance means serially connected between said direct current saturating winding and the potentiometer, and normally closed short-circuit means connected in parallel with said resistance means to by-pass said resistance means and responsive to the welding circuit power to momentarily open and insert the resistance in the circuit during initial establishment of the arc.

5. An arc welding circuit adapted to be connected to an A.C. source and having alternately active load current windings carrying the negative and positive portions of the input current and having direct current saturating winding means magnetically coupled with said load current windings to control the current and establish a drooping arc voltage characteristic having a relatively high open circuit voltage and a low welding voltage, which comprises a source of direct current, a potentiometer parallel connected to said source of direct current and to said saturating winding means by a common connection and by a movable connection to adjust the direct current supplied to said winding means, switch means connected in the potentiometer circuit between the potentiometer and the common connection to said current source and said saturating winding means and responsive to the welding circuit power to momentarily open said switch means during initial establishment of the arc, resistance means serially connected between said direct current saturating winding and the potentiometer, and switch means adapted to operably disconnect said resistance means from the circuit generally incident to normal welding current.

6. In an arc welding circuit adapted to be connected to an A.C. source and having alternately active load current windings carrying the negative and positive portions of the input current and having direct current saturating winding means magnetically coupled with said load current windings to control the current and establish a drooping arc voltage characteristic having a relatively high open circuit voltage and a low welding voltage, a source of direct current, a potentiometer parallel connected to said source of direct current and to said saturating winding means by a common connection and by a movable connection to adjust the direct current supplied to said winding means, switch means connected in the potentiometer circuit between the potentiometer and the common connection to said current source and said saturating winding means, said switch means being biased to a closed position, resistance means serially connected between said direct current saturating winding and the potentiometer, switch means connected in parallel with said resistance and biased to a closed position, direct current electromagnetic means controlling the position of said switch means, means to establish a direct current in proportion to the welding arc voltage and connected to said electromagnetic means to energize the same, and a condenser connected across said electromagnetic means for simultaneous energization with said electromagnetic means to maintain said electromagnetic means energized for a predetermined period after reduction to the welding arc voltage.

7. In an arc welding circuit adapted to be connected to an alternating current supply and having a drooping voltage characteristic to supply welding current to an arc and including saturable core means to adjust the welding current, circuit means to increase the saturation of said saturable core means during establishment of the arc including direct current winding means linking said saturable core means, adjustable resistance means connected in series with said winding means to adjust the rate of current rise during establishment of the arc, short circuit switch means connected in parallel with said resistance means and biased to closed position and responsive to the voltage across the arc to open the switch means incident to open circuit voltage, and time delay means operably associated with the switch means to maintain said switch means open for a predetermined period after the voltage at the arc reduces from the open circuit voltage.

8. In an arc welding circuit adapted to be connected to an alternating current source and having alternately active load current windings carrying the negative and positive portions of the input current and having direct current saturating winding means magnetically coupled with said load current windings to vary the welding output current, a source of direct current, a potentiometer connected in parallel to said source of direct current and to said saturating winding means by a common connection and a movable connection to adjust the direct current supplied to said winding means, switch means connected in the potentiometer circuit between the potentiometer and the common connection to said current source and said saturating winding means, means responsive to the welding circuit power to momentarily open said switch means during initial establishment of the arc, variable resistance means serially connected between said direct current saturating winding and said potentiometer, the rate of current rise in said welding circuit during the initial establishment of the arc varying in accordance with the setting of said resistance means, and normally closed switch means connected in parallel with said resistance means to by-pass said resistance means and open in response to the welding voltage during establishment of the arc to insert the resistance in the circuit.

9. In an arc welding circuit adapted to be connected to an A.C. input source and having alternately active load current windings carrying the negative and positive portions of the input current and having direct current saturating winding means magnetically coupled with said load current windings, a source of direct current, a potentiometer connected to said source of direct current and to said saturating winding means by a common connection and an adjustable connection to adjust the direct current supplied to said winding means, switch means connected in the potentiometer circuit between the potentiometer and the common connection and responsive to the welding circuit power to momentarily open and break the common potentiometer circuit connection during initial establishment of the arc, and normally open switch means serially connected with said first-named switch means between the potentiometer and the common connection, said switch means being responsive to completion of the connection to said A.C. source to close and complete the common potentiometer circuit connection whereby disconnection from the A.C. input source is equivalent to standby open circuit position prior to establishment of an arc.

10. In an arc welding circuit adapted to be connected to an A.C. source and having alternately active load current windings carrying the negative and positive portions of the input current and having direct current saturating winding means magnetically coupled with said load current windings, a source of direct current, a potentiometer connected to said source of direct current and to said saturating winding means and including a common connection and a movable connection to adjust the direct current supplied to said winding means, and switch means connected in the potentiometer circuit between the potentiometer and the common connection to said current source and said saturating winding means and responsive to open circuit voltage and substantially zero voltage across the electrode and work to operably open the common connection of the potentiometer in the circuit.

11. In an arc welding circuit adapted to be connected to an alternating current source and having alternately active load current windings carrying the negative and positive portions of the input current and having direct current saturating winding means magnetically coupled with said load current windings, a source of direct current, a potentiometer connected to said source of direct current and to said saturating winding means by a common connection and an adjustable connection to adjust the direct current supplied to said winding means, and a relay means including a winding responsive to the voltage between the electrode and the work and normally closed contacts serially connected between the potentiometer and the common connection, said relay means being constructed to quickly open said contact upon a predetermined level of energization of the winding and to close said contact after a preselected period of a predetermined smaller energization.

12. In an arc welding circuit having control means adapted to be connected to an alternating current source to establish a drooping voltage-amperage current source to supply current to an arc between an electrode and a work member, an adjustable saturable magnetic core means to adjust the level of welding current supplied to the arc, means responsive to the voltage across the electrode and work to momentarily increase the saturation of the core means during initial establishment of the arc, and means responsive to the completion of the connection of the control means to the current source and responsive to the potential between the electrode and the work to establish a corresponding operating control circuit connection during idling connection and a completely open circuit connection.

13. In an arc welding circuit adapted to be connected to an alternating current source to establish a drooping voltage-amperage current output for welding and having adjustable saturable magnetic core means interlinked therewith and having saturating winding means in said core means to adjust the level of welding current supplied to an electrode and a work member, a source of direct current, an adjustable resistance means connected across the direct current source and in parallel with the winding means to adjustably supply direct current to the saturating winding means to saturate the core means, electroresponsive switch means in series with said resistance means in the parallel branch and biased to a closed circuit position, said electroresponsive switch means being responsive to the voltage across the electrode and the work member to momentarily open the parallel resistive branch of the circuit and thereby increase the current to the saturating winding means, and second electroresponsive switch means connected in the parallel resistive branch in series with said resistance means and said first electromagnetic switch means and biased to an open circuit position, said second electromagnetic switch means being responsive to the connection of the electrode and the work member to the alternating current source to assume a closed circuit position.

14. In an arc welding circuit having control means adapted to be connected to an alternating current source and including adjustable saturable magnetic core means interlinked therewith and having saturating winding means for said core means to adjust the level of welding current to an electrode and a workpiece and to establish a drooping voltage-amperage current source, a source of direct current, a resistance means connected across the direct current source and in parallel with the winding means by a common connection and an adjustable connection to adjustably saturate the core means, electroresponsive switch means in said parallel branch in series with said resistance means adjacent the common connection and biased to a closed circuit position, said switch being responsive to the voltage across the electrode and the workpiece to open the parallel branch of the circuit and thereby increase the current to the saturating winding means, second electroresponsive switch means in said parallel branch adjacent the common connection and biased to an open circuit position, said second switch being responsive to the connection of the electrode and the workpiece to the alternating current source to assume a closed circuit position, and manually controlled switch means connected across said electroresponsive switch means to selectively short out both said electroresponsive switch means.

References Cited in the file of this patent

UNITED STATES PATENTS

| 2,036,233 | Pakala | Apr. 7, 1936 |
| 2,365,611 | White | Dec. 19, 1944 |
| 2,432,529 | Locke | Dec. 16, 1947 |

FOREIGN PATENTS

| 671,573 | Germany | Feb. 9, 1939 |
| 618,630 | Great Britain | Feb. 24, 1949 |
| 735,544 | Great Britain | Aug. 24, 1955 |